(12) United States Patent
Cote et al.

(10) Patent No.: US 10,587,684 B2
(45) Date of Patent: Mar. 10, 2020

(54) APPARATUS AND METHODS FOR PROVIDING NETWORK SECURITY ON A MOBILE PLATFORM

(71) Applicant: BOMBARDIER INC., Dorval (CA)

(72) Inventors: Jean-Richard Cote, Sainte-Therese (CA); Jayson Agagnier, Toronto (CA)

(73) Assignee: C SERIES AIRCRAFT LIMITED PARTNERSHIP, Mirabel (CA)

(*) Notice: Subject to any disclaimer, the term of this patent is extended or adjusted under 35 U.S.C. 154(b) by 177 days.

(21) Appl. No.: 15/102,939

(22) PCT Filed: Dec. 4, 2014

(86) PCT No.: PCT/IB2014/066605
§ 371 (c)(1),
(2) Date: Jun. 9, 2016

(87) PCT Pub. No.: WO2015/087216
PCT Pub. Date: Jun. 18, 2015

(65) Prior Publication Data
US 2017/0310748 A1    Oct. 26, 2017

Related U.S. Application Data

(60) Provisional application No. 61/915,584, filed on Dec. 13, 2013.

(51) Int. Cl.
*H04L 29/08* (2006.01)
*H04L 29/06* (2006.01)
*G06F 3/06* (2006.01)

(52) U.S. Cl.
CPC .......... *H04L 67/1095* (2013.01); *G06F 3/065* (2013.01); *G06F 3/067* (2013.01);
(Continued)

(58) Field of Classification Search
CPC .................................................. H04L 67/1095
See application file for complete search history.

(56) References Cited

U.S. PATENT DOCUMENTS 7,631,179 B2    12/2009  Kuehn et al.
7,788,382 B1*    8/2010  Jones ...................... H04L 69/14
                                                                    709/227

(Continued)

FOREIGN PATENT DOCUMENTS

CN    101124599 A    2/2008
CN    101322356 B    1/2013
(Continued)

OTHER PUBLICATIONS

PCT international Search Report and Written Opinion dated Feb. 9, 2015 re: International Application No. PCT/CA2014/066605.
(Continued)

*Primary Examiner* — Nicholas P Celani
(74) *Attorney, Agent, or Firm* — Norton Rose Fulbright Canada LLP

(57) ABSTRACT

The disclosure describes components, apparatus and methods for providing network security between computing devices and/or networks on mobile platforms such as aircraft. One such apparatus may comprise: a first memory configured for data communication with a first computing device of the mobile platform; a second memory configured for data communication with a second computing device of the mobile platform; and a controller. The controller may be configured to detect a change in data stored In the first memory and cause the change in data stored in the first memory to be reflected in the second memory by causing data transfer from the first memory to the second memory. Data transfer between the first memory and the second memory may be conducted using a non-internet protocol.

7 Claims, 4 Drawing Sheets

(52) U.S. Cl.
CPC ............ G06F 3/0619 (2013.01); H04L 63/02 (2013.01); H04L 67/12 (2013.01)

(56) References Cited

U.S. PATENT DOCUMENTS

| | | | |
|---|---|---|---|
| 7,890,755 | B2 | 2/2011 | Schnackenberg et al. |
| 8,341,298 | B2 | 12/2012 | Wilber et al. |
| 8,402,268 | B2 | 3/2013 | Dierickx |
| 2003/0093541 | A1* | 5/2003 | Lolayekar ........... H04L 67/1097 709/230 |
| 2003/0177387 | A1* | 9/2003 | Osterwalder ....... H04L 63/0209 726/12 |
| 2004/0025008 | A1* | 2/2004 | Kuehn .................... H04L 63/02 713/151 |
| 2005/0198492 | A1 | 9/2005 | Gaur et al. |
| 2009/0138385 | A1 | 5/2009 | Harnish et al. |
| 2010/0198944 | A1 | 8/2010 | Ho et al. |
| 2010/0318785 | A1 | 12/2010 | Ozgit |
| 2011/0225367 | A1* | 9/2011 | Rajvanshy .......... G06F 12/0866 711/118 |
| 2013/0081934 | A1 | 4/2013 | New |
| 2015/0067188 | A1* | 3/2015 | Chakhaiyar ............. H04L 69/18 709/232 |

FOREIGN PATENT DOCUMENTS

| | | |
|---|---|---|
| CN | 203340113 U | 12/2013 |
| CN | 102137132 B | 6/2014 |
| CN | 103384270 B | 1/2015 |
| CN | 102244649 B | 6/2015 |
| CN | 101675646 B | 2/2016 |
| CN | 101932997 B | 6/2017 |
| CN | 104053044 B | 4/2019 |
| EP | 1164766 A2 | 12/2001 |
| EP | 1164766 B1 | 2/2006 |
| WO | 2011130449 A2 | 10/2011 |

OTHER PUBLICATIONS

Michael Hurley, Network Air Gaps—Drawbridge to the Backend Office, Global Information Assurance Certification Paper, Apr. 4, 2001, SANS Institute 2000-2005.

Frederick M. Avoloi, e-Business and the Need for "Air Gap" Technology, A Whale Communications White Paper, Oct. 1999, pp. 1-7.

* cited by examiner

APPARATUS AND METHODS FOR PROVIDING NETWORK SECURITY ON A MOBILE PLATFORM

CROSS-REFERENCE TO RELATED APPLICATION

This application is a national phase application under 35 U.S.C. 371 of International Patent Application No. PCT/IB2014/066605 filed on Dec. 4, 2014, which claims priority from U.S. Provisional Patent Application Ser. No. 61/915,584 filed on Dec. 13, 2013, the entire content of which is incorporated herein by reference.

TECHNICAL FIELD

The disclosure relates generally to network security, and more particularly to network security on mobile platforms such as aircraft.

BACKGROUND OF THE ART

In computer networking, different measures are known for providing network security to prevent and monitor unauthorized access, misuse or modification of a computer network and network-accessible resources. For example, a firewall can be implemented as a software or hardware-based network security system that controls the incoming and outgoing network traffic by analyzing the data packets and determining whether they are authorized or not, based on a set of rules. A firewall can establish a barrier between a trusted, secure internal network and another network (e.g., the Internet) that is not assumed to be secure and trusted. Even though firewalls can be suitable for many applications, most existing firewalls can, at least in theory, be circumvented and therefore may not provide adequate security in some critical applications.

Air gap networking is another security measure often taken for computers and computer networks that must be extraordinarily secure. It typically consists of ensuring that a secure network is physically, electrically, and electromagnetically isolated from insecure networks, such as the public Internet or an insecure local area network. In such configurations, it is not possible for packets or datagrams to leap across the air gap from one network to another. The upside is that an air gap network can generally be regarded as a closed system unable to be accessed from the outside world. The downside is that transferring information (from the outside world) to computers on the secure network is typically labor intensive and expensive.

Improvement is therefore desirable.

SUMMARY

The disclosure describes components, apparatus, methods and computer program products useful for providing network security between computing devices and/or networks on mobile platforms including vehicles such as aircraft.

In one aspect, the disclosure describes an apparatus for providing network security and allowing data transfer between at least two computing devices. The apparatus comprises:
a first memory configured for data communication with a first computing device;
a second memory configured for data communication with a second computing device; and
a controller configured to:
detect a change in data stored in the first memory; and
cause the change in data stored in the first memory to be reflected in the second memory.

The controller may be configured to: detect a change in data stored in the second memory; and cause the change in data stored in the second memory to be reflected in the first memory.

The first memory and the second memory may be integrated into separate storage devices.

The controller may be configured to cause at least partial data synchronization between the first memory and the second memory.

The data synchronization may be substantially in real-time.

The controller may be configured to cause the change in data stored in the first memory to be reflected in a third memory configured for data communication with a third computing device of the mobile platform.

The controller may be configured to cause data transfer between the first memory and the second memory using a non-Internet protocol.

The apparatus may comprise data transfer between the first memory and the second memory using a non-Internet protocol; and data transfer between the first memory and the third memory using the non-Internet protocol.

The non-Internet protocol may comprise one of Advance Technology Attachment over Ethernet (ATAoE), Fibre Channel over Ethernet (FCoE), Infiniband, Serial Advance Technology Attachment (SATA), Parallel Advance Technology Attachment (PATA) and Universal Serial Bus (USB).

The non-Internet protocol may be configured to permit non-interactive communication between the first computing device and the second computing device.

In another aspect, the disclosure describes aircraft comprising the apparatus as defined above. One of the first computing device and the second computing device may comprise an electronic flight bag.

In another aspect, the disclosure describes an apparatus for providing network security and allowing data transfer between at least two computing devices of a mobile platform. The apparatus comprises:
a first memory configured for data communication with a first computing device of the mobile platform;
a second memory configured for data communication with a second computing device of the mobile platform; and
a controller configured to:
detect a change in data stored in the first memory; and
cause the change in data stored in the first memory to be reflected in the second memory.

The controller may be configured to: detect a change in data stored in the second memory; and cause the change in data stored in the second memory to be reflected in the first memory.

The first memory and the second memory may be integrated into separate storage devices.

The controller may be configured to cause at least partial data synchronization between the first memory and the second memory.

The data synchronization may be substantially in real-time.

At least one of the first network and the second network may comprise an Ethernet-based network.

The controller may be configured to cause the change in data stored in the first memory to be reflected in a third memory configured for data communication with a third network of the mobile platform.

The controller may be configured to cause data transfer between the first memory and the second memory using a non-Internet protocol.

The non-internet protocol may comprise one of Advance Technology Attachment over Ethernet (ATAoE), Fibre Channel over Ethernet (FCoE), Infiniband, Serial Advance Technology Attachment (SATA), Parallel Advance Technology Attachment (PATA) and Universal Serial Bus (USB).

The non-Internet protocol may be configured to permit non-interactive communication between the first network and the second network.

In another aspect, the disclosure describes an aircraft comprising the apparatus as defined above. The first network and the second network may comprise an electronic flight bag. The first network may be associated with passenger information and entertainment and the second network may be associated with airline information. The first network and the second network may be associated with aircraft control.

In another aspect, the disclosure describes an apparatus for providing network security and allowing data transfer between at least two networks of a mobile platform. The apparatus comprises:

a first memory configured for data communication with a first network of the mobile platform;

a second memory configured for data communication with a second network of the mobile platform; and a controller configured to:

detect a change in data stored in the first memory; and cause the change in data stored in the first memory to be reflected in the second memory.

The controller may be configured to: detect a change in data stored in the second memory; and cause the change in data stored in the second memory to be reflected in the first memory.

The first memory and the second memory may be integrated into separate storage devices.

The controller may be configured to cause at least partial data synchronization between the first memory and the second memory. The data synchronization may be substantially in real-time.

The controller may be configured to cause the change in data stored in the first memory to be reflected in a third memory configured for data communication with a third computing device.

The controller may be configured to cause data transfer between the first memory and the second memory using a non-Internet protocol.

The apparatus may comprise: data transfer between the first memory and the second memory using a non-Internet protocol; and data transfer between the first memory and the third memory using the non-Internet protocol.

The non-Internet protocol may comprise one of Advance Technology Attachment over Ethernet (ATAoE), Fibre Channel over Ethernet (FCoE), Infiniband, Serial Advance Technology Attachment (SATA), Parallel Advance Technology Attachment (PATA) and Universal Serial Bus (USB).

The non-Internet protocol may be configured to permit non-interactive communication between the first computing device and the second computing device.

The non-Internet protocol may be non-Ethernet-based.

In another aspect, the disclosure describes a mobile platform comprising the apparatus described herein. The mobile platform may comprise an aircraft. One of the first computing device and the second computing device may comprise an electronic flight bag of an aircraft.

In another aspect, the disclosure describes a method for data transfer between at least two computing devices of a mobile platform. The method comprises:

receiving data at a first memory from a first computing device of the mobile platform;

detecting a change in data stored in the first memory;

causing the change in data stored in the first memory to be reflected in a second memory; and transferring data from the second memory to a second computing device of the mobile platform.

The method may comprise:

receiving data at the second memory from the second computing device;

detecting a change in data stored in the second memory;

causing the change in data stored in the second memory to be reflected in the first memory; and transferring data from the first memory to the first computing device.

The method may comprise at least partially synchronizing the data stored in the first memory and in the second memory. The data synchronization may be substantially in real-time.

At least one of the first computing device and the second computing device may be part of an Ethernet-based network.

The method may comprise data transfer between the first memory and the second memory using a non-Internet protocol.

The non-internet protocol may comprise one of Advance Technology Attachment over Ethernet (ATAoE), Fibre Channel over Ethernet (FCoE), Infiniband, Serial Advance Technology Attachment (SATA), Parallel Advance Technology Attachment (PATA) and Universal Serial Bus (USB).

The non-Internet protocol may be configured to permit non-interactive communication between the first computing device and the second computing device.

One of the first computing device and the second computing device may comprise an electronic flight bag.

The first computing device may be associated with passenger information and entertainment and the second computing device is associated with airline information.

One of the first computing device and the second computing device may be associated with aircraft control.

The method may comprise causing the change in data stored in the first memory to be reflected in a third memory configured for data communication with a third computing device.

In a further aspect, the disclosure describes a computer program product for implementing a data transfer function between at least two computing devices of a mobile platform. The computer program product comprises a non-transitory computer readable storage medium having program code embodied therewith, the program code readable/executable by a computer, processor or logic circuit to cause the execution of a method comprising:

receiving data at a first memory from a first computing device of the mobile platform;

detecting a change in data stored in the first memory;

causing the change in data stored in the first memory to be reflected in a second memory; and transferring data from the second memory to a second computing device of the mobile platform.

The method may comprise:

receiving data at the second memory from the second computing device;

detecting a change in data stored in the second memory;

causing the change in data stored in the second memory to be reflected in the first memory; and transferring data from the first memory to the first computing device.

The method may comprise at least partially synchronizing the data stored in the first memory and in the second memory.

The data synchronization may be substantially in real-time.

At least one of the first computing device and the second computing device may be part of an Ethernet-based network.

The method may comprise data transfer between the first memory and the second memory using a non-Internet protocol.

The non-internet protocol may comprise one of Advance Technology Attachment over Ethernet (ATAoE), Fibre Channel over Ethernet (FCoE), Infiniband, Serial Advance Technology Attachment (SATA), Parallel Advance Technology Attachment (PATA) and Universal Serial Bus (USB).

The non-Internet protocol may be configured to permit non-interactive communication between the first computing device and the second computing device.

One of the first computing device and the second computing device may comprise an electronic flight bag.

The first computing device may be associated with passenger information and entertainment and the second computing device is associated with airline information.

One of the first computing device and the second computing device may be associated with aircraft control.

The method may comprise causing the change in data stored in the first memory to be reflected in a third memory configured for data communication with a third computing device.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

The present disclosure describes components, apparatus, methods and computer program products useful in providing security between computing devices and/or networks. The disclosure is meant to be exemplary only, and one skilled in the relevant arts will recognize that changes may be made to the various embodiments described herein without departing from the scope of the invention disclosed. Also, even though the components, apparatus, methods and computer program products disclosed herein may be said to provide network security, it should be understood that the security provided may not be absolute security. For example, the components, apparatus, methods and computer program products disclosed herein may, in various embodiments, reduce a potential for remote electronic access to networks by unauthorized persons and reduce security vulnerabilities related to the introduction of viruses, worms, user mistakes and intentional alteration of networks, systems and/or databases of mobile platforms (e.g., aircraft). It should also be understood that the levels of security may vary between embodiments disclosed herein and that different levels may be suitable for different applications.

Figure 1:
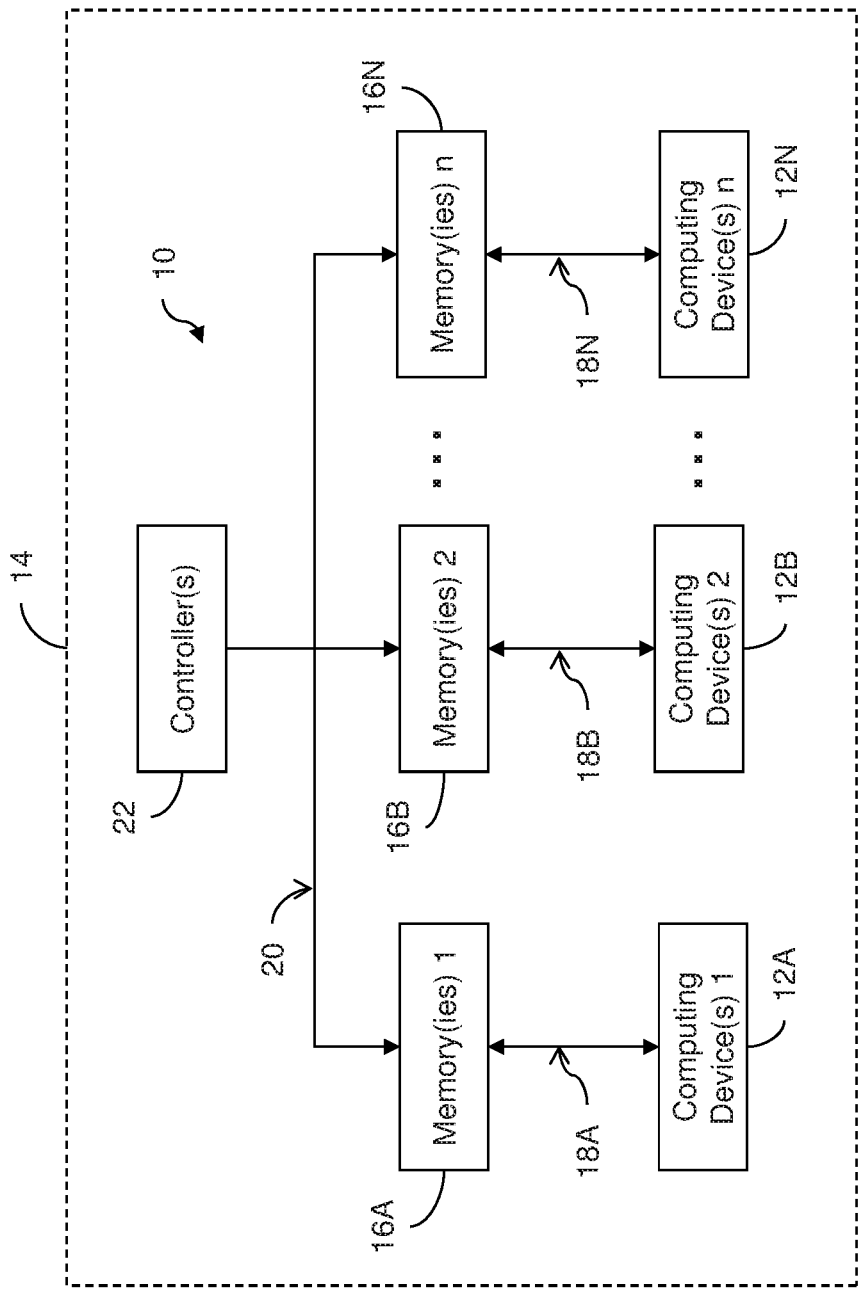
FIG. 1 shows a schematic illustration of an apparatus for providing network security between a plurality computing devices of a mobile platform.

FIG. 1 shows a schematic illustration of an exemplary apparatus, generally shown at 10, for providing network security and also allowing data transfer between a plurality of computing devices 12A-12N of a mobile platform 14. Examples of types of mobile platforms 14 to which apparatus 10 may be used include aircraft, trains, ships, automobiles or other types of manned or unmanned vehicles. For example, mobile platform 14 may be a passenger aircraft such as corporate, private, commercial or any other type of aircraft. For example, mobile platform 14 may be a narrow-body, twin engine jet airliner. As explained further below, computing devices 12A-12N may be associated with different systems of mobile platform 14 and may require some level of isolation (e.g., security) between them. Computing devices 12A-12N may also be part of different networks of mobile platform 14.

Apparatus 10 may comprise one or more first memory(ies) 16A (referred hereinafter as "first memory 16A") configured for data communication with one or more first computing device(s) 12A (referred hereinafter as "first computing device 12A") of mobile platform 14. Apparatus 10 may comprise one or more second memory(ies) 16B (referred hereinafter as "second memory 16B") configured for data communication with one or more second computing device(s) 12B (referred hereinafter as "second computing device 12B") of mobile platform 14. Apparatus 10 may comprise one or more additional (i.e., third) memory(ies) 16N (referred hereinafter as "additional memory 16N") respectively configured for data communication with one or more additional (i.e., third) corresponding computing device(s) 12N (referred hereinafter as "additional computing device 12N") of mobile platform 14.

The number of memories 16A-16N may correspond to the number of computing devices 12A-12N between which security is to be provided. In various embodiments, there may be a one-to-one relationship between one or more of memories 16A-16N and computing devices 12A-12N depending on the type and level of security required between computing devices 12A-12N. For example, each of memories 16A-16N may be in data communication with a respective one of computing devices 12A-12N via corresponding links 18A-18N. In other words, each computing device 12A-12N may have its own dedicated memory 16A-16N. Alternatively or in addition, there may be a one-to-many relationship between one or more of memories 16A-16N and computing devices 12A-12N where each of the one or more memories 16A-16N may be in data communication with a plurality of computing devices 12A-12N.

Memories 16A-16N may be used to provide data transfer between computing devices 12A-12N but may also be used by respective computing devices 12A-12N for other purposes. For example, data transfer between memories 16A-16B may be established via one or more links 20 (referred hereinafter as "link 20"). As explained further below the data transfer via link 20 may be more secure than data transfer via one or more of links 18A-18N and may provide sufficient isolation suitable for some applications. Link 20 and links 18A-18N may comprise wired and/or wireless connections. Apparatus 10 may comprise one or more controllers 22 (referred hereinafter as "controller 22"). Controller 22 may control the transfer of data between one or more of memories 16A-16N. Controller 22 may comprise one or more data processors (not shown) configured to execute computer-readable instructions stored in suitable memory. Such computer-readable instructions may cause controller 22 to monitor data in one or more of memories 16A-16N and cause at least some of the data to be copied or transferred from one of memories 16A-16N to one or more of other memories 16A-16N. Accordingly, controller 22 may be configured to executed computer-readable instructions and cause data in memories 16A-16N to be updated. For example, in various embodiments, controller 22 may be configured to detect a change in data stored in first memory 16A and cause the change in data stored in first memory 16A to be reflected in second memory 16B by causing data transfer from first memory 16A to second memory 16B via link 20. Similarly, controller 22 may be configured to cause the change in data stored in first memory 16A to be reflected in second memory 16B as well as additional memory 16N by causing data transfer from first memory 16A to second memory 16B and to additional memory 16N via link 20. In addition, controller 22 may also be configured to cause changes in data stored in any one of memories 16A-16B to be reflected in one, some or all of memories 16A-16B. In other words, controller 22 may be configured to conduct at least partial synchronization of the data in memories 16A-16B.

The detection of a change in the data may comprise any suitable known or other method that may be used to recognize that a change in the data has been made. In various embodiments, controller 22 may, for example, be configured to substantially continuously or intermittently poll one or more of memories 16A-16N in order to detect any changes in the data stored in memories 16A-16N. For example, a change may be detected by comparing values between memories 16A-16N and in case of discrepancy(ies), taking the most recent value(s) as being correct and duplicating those one or more values in the other memories 16A-16N. Alternatively or in addition, controller 22 may keep a separate copy of the data that is shared between memories 16A-16N and use that copy for comparison against the data in memories 16A-16N for the purpose of detecting changes made in memories 16A-16N. Alternatively, or in addition, controller 22 may be configured to automatically duplicate data to other memories 16A-16N when data is written to one of memories 16A-16N without performing any comparison of the data.

When a change is detected in one of memories 16A-16N using one or more of the methods described herein or other method(s), controller 22 may cause the change to be reflected in one or more of memories 16A-16N. The polling rate of controller 22 may be selected so that data may be transferred between memories 16A-16N within an acceptable time period without substantially negatively affecting the performance of any one of computing devices 12A-12N. In various embodiments, the polling rate of controller 22 may be selected such that the synchronization of data between memories 16A-16N may effectively be considered to be substantially in real-time for the purposes of the functions performed by computing devices 12A-12N. Controller 22 may be configured to automatically detect changes and also automatically cause the changes to be reflected in the one or more memories 16A-16N. In various embodiments, only the data that has changed may need to be transferred to the other memories 16A-16N.

In various embodiments, controller 22 may operate under the guidance of one or more existing or other synchronization software solutions (i.e., products). Some exemplary existing synchronization software solutions that may be suitable in some embodiments may include open source software such as RSYNC™, LSYNC™, freeware such as ROBOCOPY™ and/or other commercially available software solutions such as GOODSYNC™.

Even though controller 22 is illustrated as a separate element, it should be understood that controller 22 may comprise a single control device or the functionality of controller 22 may be distributed between a plurality of devices. For example, it should be understood that each storage device comprising a respective memory 16A-16N may also comprise its own control device which may play a role in causing data to be transferred between memories 16A-16N. Alternatively, controller 22 may be integrated in one device comprising one of memories 16A-16N.

Each memory 16A-16N may be integrated into its own separate and independent storage device. Memories 16A-16N may comprise any suitable storage means (e.g. devices) for retrievably storing machine-readable instructions and/or data parameters. Memories 16A-16N may be non-volatile. Memories 16A-16N may contain data parameters that may be written and read by respective computing devices 12A-12N. Memories 16A-16N may comprise one or more electromagnetic, electromechanical or other electronic media suitable for storing electronic data signals in volatile or non-volatile, non-transient form. For example, one or more of memories 16A-16N may comprise a solid-state drive (SSD) (also known as a solid-state disk) to store data persistently. Suitable types of memories 16A-16N may, for example, include Serial Advance Technology Attachment (SATA) based devices. Small Computer System Interface (SCSI) based devices and Internet Small Computer System Interface (iSCSI) based devices. Memories 16A-16N may comprise other suitable known or other types of storage media or devices. Memories 16A-16N may comprise similar or different types of storage media which may have similar or different storage capacity. In various embodiments, links 18A-18N may permit respective computing devices 12A-12N to read from and write to associated respective memories 16A-16N.

The use of intermediate memories 16A-16N (optionally synchronized in substantially real-time) between computing devices 12A-12N may provide a layer of network security between computing devices 12A-12N. Data transfer between computing devices 12A-12N may be conducted between intermediate memories 16A-16N instead of directly between computing devices 12A-12N. In various embodiments, there may not be any means of communication between computing devices 12A-12N other than via memories 16A-16N and link 20.

Figure 2:
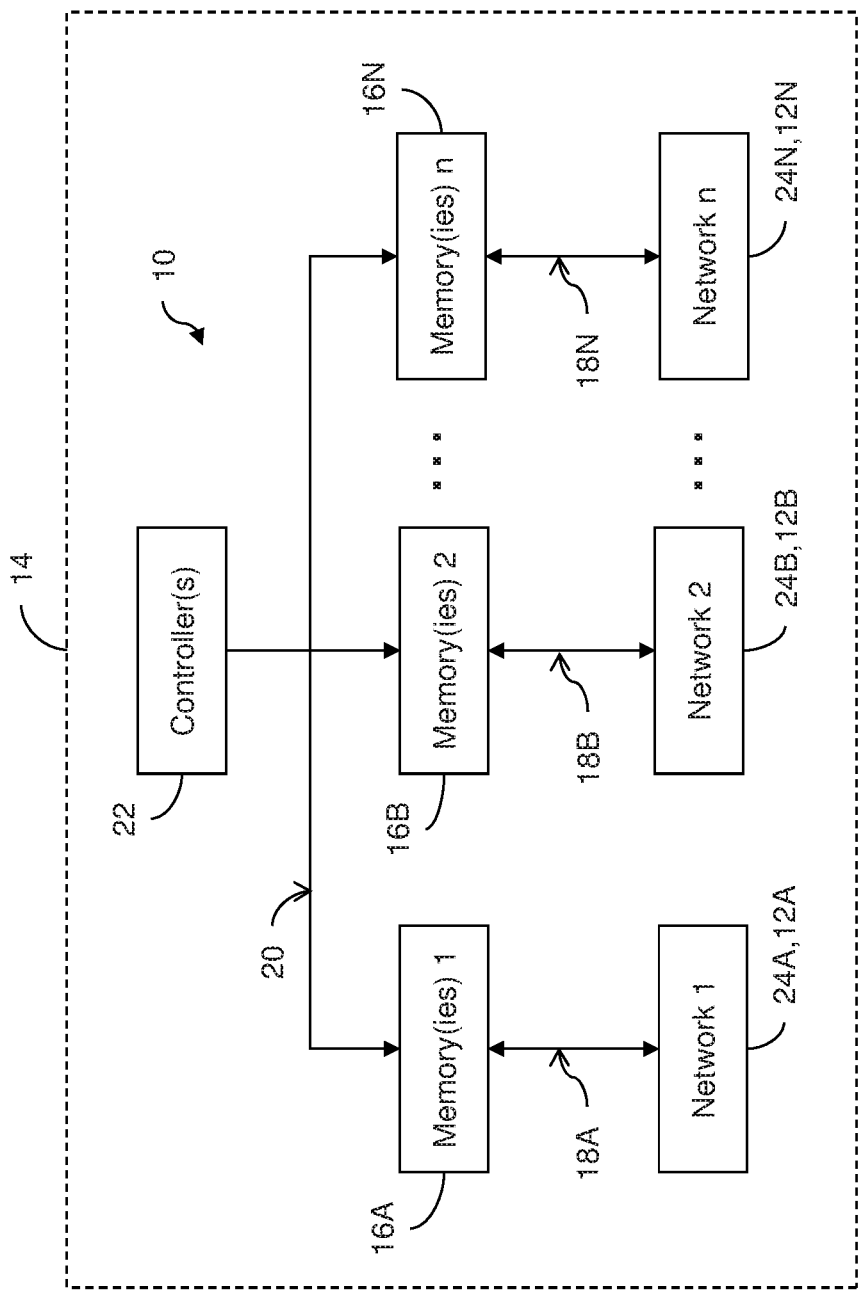
FIG. 2 shows a schematic illustration of the apparatus of FIG. 1 for providing network security between a plurality of networks of a mobile platform.

FIG. 2 shows a schematic illustration of apparatus 10 (generally similar to that shown in FIG. 1) for providing network security and allowing data transfer between a plurality of networks 24A-24N of mobile platform 14. For example, mobile platform 14 may include first network 24A, second network 24B and one or more additional (i.e., third) networks 24N. Networks 24A-24N may respectively include computing devices 12A-12N of FIG. 1. Networks 24A-24N may be used for different purposes in mobile platform 14 and may require some level of isolation (i.e., security) between them. Accordingly, apparatus 10 may be used to provide security between: two or more individual computing devices 12A-12N; between small and/or large networks 24A-24N; and/or between a combination of one or more individual computing devices 12A-12N and one or more networks 24A-24N.

Networks 24A-24N and/or computing devices 12A-12N may be of different categories or domains (e.g., closed, private and public) and it may be desirable to provide isolation between them to prevent unauthorized access or data transfer between them. In an aircraft for example, some networks 24A-24N may be required to be more secure than others. For example, some networks 24A-24N may be required to be essentially closed, some may be required to be private while others may be public. Closed networks and computing devices may be associated with controlling the aircraft and may include networks and computing devices associated with: flight and embedded control systems; cabin systems and air-ground network interfaces such as very high frequency (VHF), high frequency (HF), satellite communications (SATCOM) and wireless including cellular and WiFi. Private networks and computing devices may be associated with airline information services and may include networks and computing devices associated with administrative support, flight support, cabin support and maintenance. Other private networks and computing devices may be associated with passenger information and entertainment services and may include networks and computing devices associated with inflight entertainment and passenger internet access.

Public networks and computing devices may include passenger-owned devices such as, for example, laptop computers, personal electronic devices, wireless devices and gaming devices. Such passenger-owned devices may be connected to the Internet and become hosts for malicious software such as viruses, Trojan horses, rootkits, etc. Accordingly, it can be important to provide adequate isolation between different networks and computing devices on mobile platform 14 to prevent, for example, unauthorized access to a network or computing device associated with aircraft control from a passenger-owned device.

One of computing devices 12A-12N may, for example, include an electronic flight bag (EFB) which may include an electronic information management device that may help flight crews perform flight management tasks more easily and efficiently with less paper. EFBs are divided into three hardware classes as defined in the Federal Aviation Administration (FAA) Order 8900.1 FAA Inspector Handbook Guidance on Flight Standards Information Management System (FSIMS), which is incorporated herein by reference in its entirety. For example, a class 2 EFB may comprise a portable electronic device such as a laptop computer that can be removed from an aircraft, connected to the internet and become a host for malicious software such as viruses, Trojan horses, rootkits, etc. When in use in an aircraft, the EFB may be connected to a docking station in the cockpit of an aircraft and require access to data from one or more networks in the airline information services domain and/or the aircraft control domain via apparatus 10. An EFB may be considered to be part of the public domain so apparatus 10 may provide some isolation between the EFB and other computing devices 12A-12N and/or networks 24A-24N in the aircraft. An EFB may also comprise an electronic logbook (ELB) application which may be populated using software running on the EFB and also on the cabin management system of the aircraft where the cabin management system may be part of the airline information services domain.

The use of intermediate memories 16A-16N (optionally synchronized in substantially real-time) between computing devices 12A-12N and/or networks 24A-24N may provide a layer of network security between computing devices 12A-12N and/or networks 24A-24N. Data transfer between computing devices 12A-12N and/or networks 24A-24N may be conducted between intermediate memories 16A-16N instead of directly between computing devices 12A-12N and/or networks 24A-24N. In various embodiments, there may not be any means of communication between networks 24A-24N other than via memories 16A-16N and link 20.

Figure 3:
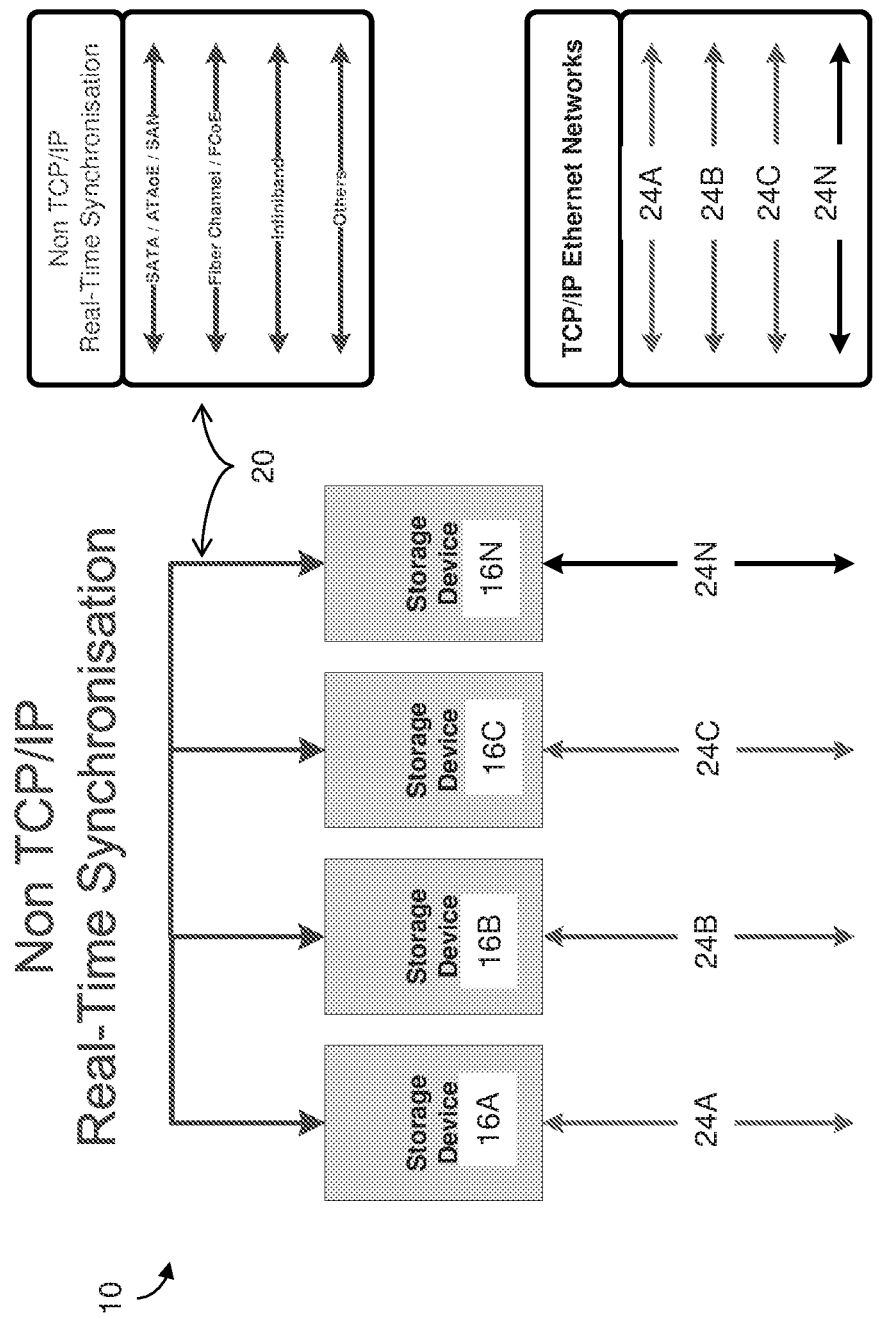
FIG. 3 shows another schematic illustration of the apparatus of FIG. 1.

FIG. 3 shows another schematic illustration of the apparatus 10 of FIG. 1 and FIG. 2. Controller 22 is not shown in FIG. 3 and memories 16A-16N are also illustrated as separate storage devices. Apparatus 10 may also provide network security between computing devices 12A-12N and/or networks 24A-24N through the use of a different data communication protocol on link 20 than the communication protocol(s) used in networks 24A-24N. For example, one or more of networks 24A-24N may be Ethernet-based and data communication within networks 24A-24N may be conducted using a protocol from the Internet suite of protocols commonly known as TCP/IP (referred hereinafter as "Internet protocol"). An Internet protocol provides end-to-end connectivity specifying how data should be formatted, addressed, transmitted, routed and received at the destination. In various embodiments, data transfer between memories 16A-16N and respective networks 24A-24N and/or computing devices 12A-12N on links 18A-18N may be conducted using an Internet protocol.

The communication protocol used on link 20 may be different than the communication protocol used within networks 24A-24N in order to provide some isolation between networks 24A-24N. The different communication protocol used on link 20 may provide a protocol break between computing devices 12A-12N, between networks 24A-24N or between computing devices 12A-12N and networks 24A-24N. For example, while networks 24A-24N may be Ethernet-based and make use of an Internet protocol for transferring data within each individual network 24A-24N, data transfer on link 20 between intermediate memories 16A-16N may conducted using a non-Internet protocol. In various embodiments, such non-Internet communication protocol used on link 20 may provide non-interactive communication between memories 16A-16N and thereby permit non-interactive communication between computing devices 12A-12N and/or networks 24A-24N. In some embodiments, such non-interactive communication may conducted substantially in real-time. Such non-Internet protocols may include communication protocols suitable for use with Ethernet networking technology (i.e., Ethernet-based) or other networking technologies. For example, such non-Internet protocols suitable for use with Ethernet networking technology may include Advance Technology Attachment over Ethernet (ATAoE), Fibre Channel over Ethernet (FCoE) and Infiniband. Examples of non-Internet protocols that may not be Ethernet-based (i.e., non-Ethernet-based) may include Serial Advance Technology Attachment (SATA), Parallel Advance Technology Attachment (DATA) and Universal Serial Bus (USB). It should be understood in light of the present disclosure that other known or other types of non-Internet protocols could also be used on link 20.

By employing a non-Internet protocol for data transfer over link 20, network traffic from networks 24A-24N may not be routable over link 20. When an Internet protocol is used within networks 24A-24N, the use of a non-Internet protocol between memories 16A-16N may provide a protocol break between the Internet protocols of networks 24A-24N and provide further security between networks 24A-24N. The use of a non-Internet protocol between memories 16A-16N may provide some form of isolation between computing devices 12A-12N and/or between networks 24A-24N by ensuring that there is no direct connection at the Internet protocol level between computing devices 12A-12N and/or between networks 24A-24N. In other words, the use of a non-Internet protocol between memories 16A-16N may, in some embodiments, provide non-interactive communication between two or more of memories 16A-16N. Accordingly, the use of a non-Internet protocol between memories 16A-16N may provide isolation from the types of attacks that are common in Internet protocol networks such as Ethernet-based networks. For example, the use of a non-Internet protocol between memories 16A-16N may, in some cases, reduce the risk of routed intrusions into one or more computing devices 12A-12N or into one or more networks 24A-24N, which may be part of a control system of mobile platform 14 (e.g., aircraft).

In various embodiments, the use of intermediate memories 16A-16N and optionally the use of a non-Internet protocol between memories 16A-16N may provide adequate security for some applications. In such cases, no further security measures such as data checking or firewalls may be required in conjunction with apparatus 10. In various embodiments, apparatus 10 may prevent or reduce the risk of interactive stream data exchange required for application activity. However, in some embodiments, it may be desirable to use the methods and apparatus disclosed herein in conjunction with one or more other forms of security measures depending on security requirements.

During operation, apparatus 10 may be used to provide some level of network security while permitting data transfer between computing devices 12A-12N, between networks 24A-24N and/or between one or more computing devices 12A-12N and one or more networks 24A-24N. In various embodiments, data transfer on link 20 may be limited to data values such as parameters that may need to be shared between computing devices 12A-12N and/or networks 24A-24N. In various embodiments, the transfer of commands or functions may not be permitted on link 20. For example, controller 22 may be configured to only cause synchronization of pre-defined data fields (i.e., partial synchronization) in memories 16A-16N in accordance with the methods described herein.

Figure 4:
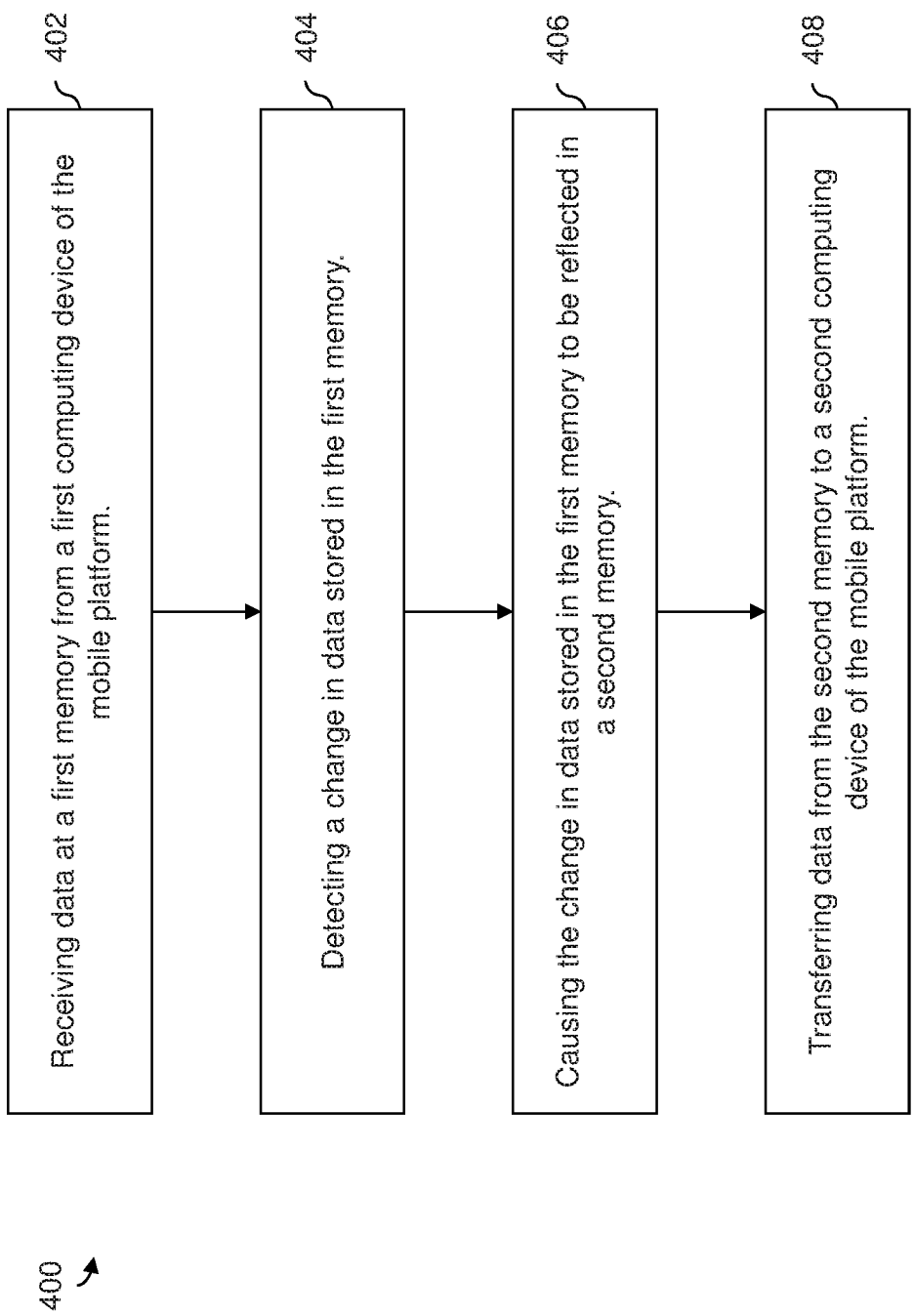
FIG. 4 is a flow chart illustrating a method for data transfer between at least two computing devices of a mobile platform.

FIG. 4 is a flow chart illustrating a method 400 for data transfer between at least MO computing devices 12A-12N and/or networks 24A-24N of mobile platform 14. Method 40 may be conducted using apparatus 10 described above. Method 400 may comprise: receiving data at first memory 16A from first computing device 12A of mobile platform 14 (see block 402); detecting a change in data stored in first memory 16A (see block 404); causing the change in data stored in first memory 16A to be reflected in second memory 16B (see block 406); and transferring data from second memory 16B to second computing device 12B of mobile platform 14 (see block 408).

Method 400 may comprise fewer or additional blocks than those shown in FIG. 4. For example, method 400 may be conducted in a different order than what is shown in FIG. 4. For example, method 400 may alternatively or in addition to blocks 402, 404, 406 and 408 comprise: receiving data at second memory 16B from second computing device 12B; detecting a change in data stored in second memory 16B; causing the change in data stored in second memory 16B to be reflected in first memory 16A; and transferring data from first memory 16A to first computing device 12A.

Method 40 may also comprise causing the change in data stored in first memory 16A and/or second memory 16B to be reflected in additional (third) memory 16N by transferring the data to additional memory 16N.

As described above, the data transfer between memories 16A-16N may be conducted using a non-Internet protocol. Examples of suitable non-Internet protocols may be used in conjunction with method 400 and apparatus 10 may include one of Advance Technology Attachment over Ethernet (ATAoE), Fibre Channel over Ethernet (FCoE), Infiniband, Serial Advance Technology Attachment (SATA), Parallel Advance Technology Attachment (DATA) and Universal Serial Bus (USB).

Method 400 may also comprise at least partially synchronizing first memory 16A and second memory 16B. Method 400 may comprise synchronizing additional memory 16N in additional to first and second memories 16A, 16B. The data synchronization may be substantially in real-time.

One or more computing devices 12A-12N may be part of one or more respective networks 24A-24N and that method 400 may be used to transfer data between networks 24A-24N while also providing some network security between computing devices 12A-12N and/or networks 24A-24N. For example, one or more of networks 24A-24N may be an Ethernet-based network and one of computing devices 12A-12N may comprise an electronic flight bag. One of computing devices 12A-12N may be associated with a passenger information and entertainment domain and another of computing devices 12A-12N may be associated with an airline information network domain. Similarly, one of computing devices 12A-12N may be associated with an airline information domain and another of computing devices 12A-12N may be associated with an aircraft control domain.

Various aspects of the present disclosure may be embodied as an apparatus, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present disclosure may take the form of a computer program product embodied in one or more non-transitory computer readable medium(ia) having computer readable program code (machine-readable instructions) embodied thereon. The computer program product may, for example, be executed by a computer, processor or other suitable logic circuit to cause the execution of one or more methods disclosed herein in entirety or in part. For example, such computer program product may comprise computer readable program code for execution by controller 22 shown in FIGS. 2 and 3.

Any combination of one or more computer readable medium(ia) may be utilized. The computer readable medium may be a computer readable signal medium or a non-transitory computer readable storage medium. A non-transitory computer readable storage medium may comprise, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or other programming languages. The program code may execute entirely or in part by controller 22 (see FIGS. 1 and 2) or other computer.

Aspects of the present disclosure are described with reference to the flowchart of FIG. 4 and schematic diagrams of FIGS. 1-3 illustrating methods, apparatus (systems) and computer program products according to embodiments of the present disclosure. One or more blocks of FIG. 4 and/or other methods or part(s) of methods disclosed herein may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts of one or more methods disclosed herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function(s)/act(s) of one or more methods disclosed herein.

The computer program instructions may also be loaded onto a computer, other programmable data processing apparatus, or other device(s) to cause a series of operational steps to be performed on the computer, other programmable apparatus or other devices to produce a computer implemented process such that the instructions which execute on the computer or other programmable apparatus provide processes for implementing the functions/acts of one or more methods disclosed herein. In various embodiments, the computer program instructions may, for example, be loaded onto controller 22.

An exemplary computer program product in accordance with the present disclosure may be configured to implement a data transfer function between at least two computing devices 12 and/or networks 24 of mobile platform 14. The computer program product may comprise a non-transitory computer readable storage medium having program code embodied therewith. The program code may be readable/executable by a computer, processor or logic circuit such as controller 22 to cause the execution of method 400 or part thereof. For example, such method may comprise: receiving data at a first memory from a first computing device of the mobile platform; detecting a change in data stored in the first memory; causing the change in data stored in the first memory to be reflected in a second memory; and transferring data from the second memory to a second computing device of the mobile platform. The data transfer function implemented via the computer program product may include fewer or additional functions/acts including those disclosed herein.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the components, apparatus, methods and computer program products disclosed and shown herein may comprise a specific number of elements/components, the components, apparatus, methods and computer program products may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. An aircraft comprising an apparatus for providing network security and allowing data transfer between at least two computing devices of a mobile platform, the apparatus comprising:

a first memory configured for data communication with a first computing device of the mobile platform; a second memory configured for data communication with a second computing device of the mobile platform, the first memory and the second memory integrated into separate storage devices, wherein the first and second computing devices are associated with aircraft control; and a controller configured to:

at a polling rate, poll the first memory to automatically detect a change in data stored in the first memory;

cause the change in data stored in the first memory to be reflected in the second memory by causing data transfer between the first memory and the second memory using a non-Internet protocol;

cause data synchronization of only the data of pre-defined data fields between the first memory and the second memory, wherein the data of the pre-defined data fields consists of parameters that are needed to be shared between the first and second devices in order to control the aircraft, the data synchronization based at least in part on the polling rate; and prevent transfer of commands and functions from the first memory to the second memory, wherein:

a communication protocol used for the data communication between the first memory and the first computing device is different from the non-Internet protocol used between the first memory and the second memory, a communication protocol used for the data communication between the second memory and the second computing device is different from the non-Internet protocol used between the first memory and the second memory, and the polling rate is selected to cause the data synchronization of the second memory substantially in real-time.

2. The aircraft as defined in claim 1, wherein the controller is configured to:

detect a change in data stored in the second memory; and cause the change in data stored in the second memory to be reflected in the first memory.

3. The aircraft as defined in claim 1, wherein the controller is configured to cause the change in data stored in the first memory to be reflected in a third memory configured for data communication with a third computing device of the mobile platform.

4. The aircraft as defined in claim 3, comprising data transfer between the first memory and the third memory using the non-Internet protocol.

5. The aircraft as defined in claim 1, wherein the non-Internet protocol comprises one of Advance Technology Attachment over Ethernet (ATAoE), Fibre Channel over Ethernet (FCoE), Infiniband, Serial Advance Technology Attachment (SATA), Parallel Advance Technology Attachment (PATA) and Universal Serial Bus (USB).

6. The aircraft as defined in claim 1, wherein the non-Internet protocol is configured to permit non-interactive communication between the first computing device and the second computing device.

7. The aircraft as defined in claim 1, wherein one of the first computing device and the second computing device comprises an electronic flight bag.

* * * * *